(12) United States Patent
Agarwal et al.

(10) Patent No.: US 6,351,742 B1
(45) Date of Patent: *Feb. 26, 2002

(54) METHOD AND MECHANISM FOR DATABASE STATEMENT OPTIMIZATION

(75) Inventors: Nipun Agarwal, San Mateo; Dinesh Das, Redwood City, both of CA (US); Jagannathan Srinivasan, New Hampshire, CT (US)

(73) Assignee: Oracle Corporation, Redwood Shores, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/272,627

(22) Filed: Mar. 18, 1999

(51) Int. Cl.$^7$ .............................................. G06F 17/30
(52) U.S. Cl. ................... 707/3; 2/4; 2/5; 2/6
(58) Field of Search ............... 707/2, 3, 5, 6; 717/4

(56) References Cited

U.S. PATENT DOCUMENTS

| | | | |
|---|---|---|---|
| 5,506,955 A | | 4/1996 | Chen et al. .................. 714/26 |
| 5,544,355 A | | 8/1996 | Chaudhuri et al. ............ 707/1 |
| 5,551,029 A | | 8/1996 | Jagadish et al. ............... 707/1 |
| 5,754,841 A | * | 5/1998 | Carino, Jr. .................... 707/3 |
| 5,930,785 A | * | 7/1999 | Lohman et al. ................ 707/2 |
| 5,960,197 A | | 9/1999 | Segnan .......................... 717/2 |
| 6,009,265 A | * | 12/1999 | Huang et al. .................. 707/1 |
| 6,012,054 A | * | 1/2000 | Seputis .......................... 707/3 |
| 6,026,391 A | * | 2/2000 | Osborn et al. ................. 707/2 |
| 6,195,653 B1 | * | 2/2001 | Bleizeffer et al. .............. 707/2 |

OTHER PUBLICATIONS (IEEE publication) An Extended Model for Integration between the Oracle and WWW by Gi–Hwa Jang et al., Dept., of Computer Sci., South Korea, pp. 569–572, vol. 1.
Derwent Information Ltd., "Database statement execution optimizing for database query or manipulation, involves associating generated function with database object, calling database statement and function to compute cost of execution plan" by N. Agarawal.

(List continued on next page.)

Primary Examiner—Diane Mizrahi
(74) Attorney, Agent, or Firm—Lyon & Lyon LLP

(57) ABSTRACT

A method and system for optimizing the execution of database statements are described. An aspect is directed to the generation of an execution plan for a database statement, wherein the database statement contains a predicate having one or more arguments whose values are not known at the time the execution plan is generated (e.g., at compile time). A feature of this aspect involves passing a description of the argument(s) to the optimizer. An example of such a description includes the argument type of the predicate argument.

34 Claims, 2 Drawing Sheets

OTHER PUBLICATIONS

Carey, M.J., et al.; "Object–Relational Database Systems: Principles, Products, and Challenges"; SIGMOD 1997, *Proceedings ACM SIGMOD International Conference on Management of Data;* May 13–15, 1997; Tucson, Arizona; ACM Press1997; SIGMOD Record 26(2), Jun. 1997; p. 502 and Tutorial Notes.

Stonebraker, M., et al.; "Object–Relational DBMSs—The Next Great Wave"; *Morgan Kaufmann Publishers Inc.,* San Francisco, CA; pp. 121–122; 1996.

Mattos, N.M.; "The KBMS–Protoytpe Krisys—User Manual"—vol. 1 Overview; Version 2.8, *Computer Science Department;* University of Kaiserslautern, Germany; Dec. 1992.

Chimenti, D. et al.; "Towards An Open Architecture For LDL"*Proceedings Of The Fifteenth International Conference On Very Large Data Bases;* pp. 195–203; Amsterdam, Aug. 1989.

Agrawal R. et al.; "ODE (Object Database and Environment): The Language And The Data Model"; *ACM SIGMOD International Conference On Management Of Data;* vol. 18, No. 2, pp. 36–45; Jun. 1989.

Finance, Beatrice et al.; "A Rule–Based Query Rewriter In An Extensible DBMS"; *IEEE Comp. Soc. Press;* vol. Conf. 7, 8; pp. 248–256; Apr. 8, 1991.

Derrett, N. et al.; "Rule–Based Query Optimization In IRIS"; *ACM Computer Science Conference;* Feb. 21–23, 1989.

Chaudhuri, Surjit; "An Overview Of Query Optimization In Relational Systems"; *Proceedings Of The AC Sigact–Sigmod–Sigart Symposium On Principles Of Database Systems,* New York; pp. 34–43; Jun. 1, 1998.

"An efficient semantic query optimization algorithm" by Pang et al. Data Engineering, (Apr. 1991) Proced of the 7th Conference, pp. 326–335.*

"Calculus–based transformations of queries over objec–oriented views in a database mediator system" by Josifovski et al. Cooperative Information Systems, Proced. IFCIS International Conference; pp. 218–229. (Aug. 1998).*

* cited by examiner

METHOD AND MECHANISM FOR DATABASE STATEMENT OPTIMIZATION

BACKGROUND OF THE INVENTION

1. Field of the Invention

The present invention relates to optimization in a database system.

2. Background

In a database system, optimization is the process of choosing an efficient way to execute a database query or manipulation action. Examples of such query or manipulation actions include searching, retrieving, modifying, organizing, adding, and/or deleting information from the database. These database query/manipulation actions are normally initiated by submitting commands to a database server in a database query language. One popular database query language is known as the Structured Query Language ("SQL"). For the purposes of explanation only, and not by way of limitation, the following description is made with particular reference to database statements involving SQL.

To execute a database query language statement (e.g., a SQL statement), the database system may have to perform steps involving the retrieval or manipulation of data from various database structures, such as tables and indexes. Often, there exists many alternate ways to execute the SQL statement. For example, a single SQL statement can be executed in different ways by varying the order in which tables and indexes are accessed to execute the statement. The exact combination and order of steps taken to execute the SQL statement can drastically change the efficiency or speed of execution for the statement. The combination and order of steps that are used to execute a SQL statement is referred to as an "execution plan."

As an example, consider the following SQL statement, which queries for the name of all employees having a salary equal to 100 from a database table "emp_table":

SELECT employee_name

FROM emp_table

WHERE salary=100

A first execution plan could include the step of performing a full table scan of emp_table to execute the query. This first execution plan would retrieve every row from emp_table to identify particular rows that match the WHERE clause. Alternatively, if an index exists for the "salary" column of emp_table, then a second execution plan could involve accessing the index to identify rows that match the WHERE clause, and thereafter retrieving only those identified rows from the table. The index is considered an alternate "access path" to the data sought by the SQL statement.

Each execution plan has a "cost" that is associated with its execution. The cost of an execution plan can be expressed in terms of the resources that are consumed to execute the SQL statement using that execution plan. For example, the cost of an execution plan can be expressed in units of I/O usage, CPU usage, network usage, memory usage, or a single numerical value that combines several of these units.

An "optimizer" is used by a database system to choose what is believed to be the most efficient execution plan for a SQL statement. A "cost-based" optimizer bases its decision upon the costs of each execution plan. The cost-based optimizer typically generates a set of potential execution plans for the SQL statement based upon available access paths for the data sought to be operated upon by that statement. The cost is then estimated for each execution plan based upon, for example, data distribution and storage characteristics for database structures holding relevant data for the SQL statement. The optimizer then compares relative costs of the execution plans to choose the one with the smallest cost.

The cost-based optimizer may use statistics to estimate the cost of the execution plans. Statistics are used to quantify the data distribution and/or storage characteristics of data in database structures. For example, with reference to the SQL statement example set forth above, statistics may be kept for the distribution of values in the "salary" column of the table "emp_table." Selectivity estimates can be performed by taking into account the data skew of data values. Selectivity is normally calculated with reference to the statistics, and can be stated as the percentage of entries within a schema object that satisfies a given predicate.

The cost of an execution plan can be estimated based upon the statistics and selectivity associated with terms within the SQL statement predicate. As an example, consider if an index exists upon the "salary" column for the above SQL statement example. If so, then the following is an example of a cost calculation that can be used to estimate the cost of an execution plan that uses an index to execute the above SQL statement:

COST=(cost of access for a single row)*(selectivity)*(number of rows in table)+(cost of index access)

An example of a cost calculation for an execution plan that performs a full table scan is expressed as follows:

COST=(cost of access for a single row of table)*(number of rows in table)

Based upon such cost calculations, an optimizer can make a determination as to which of these execution plans is relatively less costly.

Optimization of a database statement normally occurs at compilation time. If a predicate in the database statement contains one or more arguments, then the values of the arguments must be known at compile-time for optimizers to make an effective estimation of selectivity for the predicate, and thus the cost for the database statement. Unfortunately, if the values of one or more arguments are not known at compile-time, then these values cannot be passed to the optimizer. Without this information, conventional optimizers have great difficulty generating accurate predicate selectivity or cost for the database statement.

Consider the following SQL statement:

SELECT *

FROM emp_table

WHERE emp_number<:x

This database statement queries for all entries from table emp_table in which the emp_number column is less than the value of a bind variable ":x". The value of a bind variable is not necessarily known at compile-time, but instead becomes known at run-time. Since optimization occurs at compile-time, the optimizer thus does not always know the value of the bind variable :x. Therefore, it becomes difficult to estimate a selectivity value for emp-number<:x, which greatly affects the optimizer's ability to select an optimal execution plan (e.g., one that uses either an index scan or table scan).

One approach that can be taken to estimate a selectivity value is to employ a default selectivity value if a bind variable is encountered in a database statement. Typically, the default selectivity value is used regardless of exact contents or operator of the database statement. The optimizer would use the default selectivity value to compute a cost estimate for an execution plan involving that database statement. However, using a default value to calculate the cost of an execution plan may result in what is at best a gross approximation of the true cost of the execution plan. Furthermore, such default values do not take into account any parameters that may be passed to a database statement predicate. This may result in the selection of an execution plan that has a significantly higher true cost than other execution plans that could have been chosen.

An alternate approach is to heuristically guess a selectivity value. For example, a small value for the selectivity of a database statement can be assumed if the involved column is indexed. This assumption is typically employed whenever a bind variable is used as a boundary value in a condition with one of the following operators:<,>,<=, or >=. The optimizer would heuristically guess a small selectivity value for indexed columns to favor the use of indexes. The drawback to this approach is that the assumptions used in the heuristic guess do not always match up to real world conditions. For example, the assumption that an execution plan involving an index access is always more efficient than alternate execution plans may be grossly incorrect for a given query of an indexed column, depending upon the statistics for that column and the exact values of the arguments involved.

Therefore, there is a need for a method and mechanism that can optimize the execution of the database statements involving that have values which are not known at compile-time.

SUMMARY OF THE INVENTION

A method and system for optimizing the execution of database statements are described. An aspect of the present invention is directed to the generation of an execution plan for a database statement, wherein the database statement contains a predicate having one or more arguments whose values are not known at the time the execution plan is generated (e.g., at compile time). A feature of this aspect of the invention involves passing a description of the argument(s) to the optimizer. An example of such a description includes the argument type of the predicate argument.

Further details of aspects, objects, and advantages of the invention are described below in the detailed description, drawings, and claims.

BRIEF DESCRIPTION OF THE DRAWINGS

The accompanying drawings are included to provide a further understanding of the invention and, together with the detailed Description of Embodiment(s), serve to explain the principles of the invention.

DETAILED DESCRIPTION

A method and mechanism for optimizing the execution of database statements is disclosed. In the following description, for the purposes of explanation, numerous specific details are set forth in order to provide a thorough understanding of the present invention. It will be apparent, however, to one skilled in the art that the present invention may be practiced without those specific details. In other instances, well-known structures and devices are shown in block diagram form to avoid obscuring the present invention.

Figure 1:
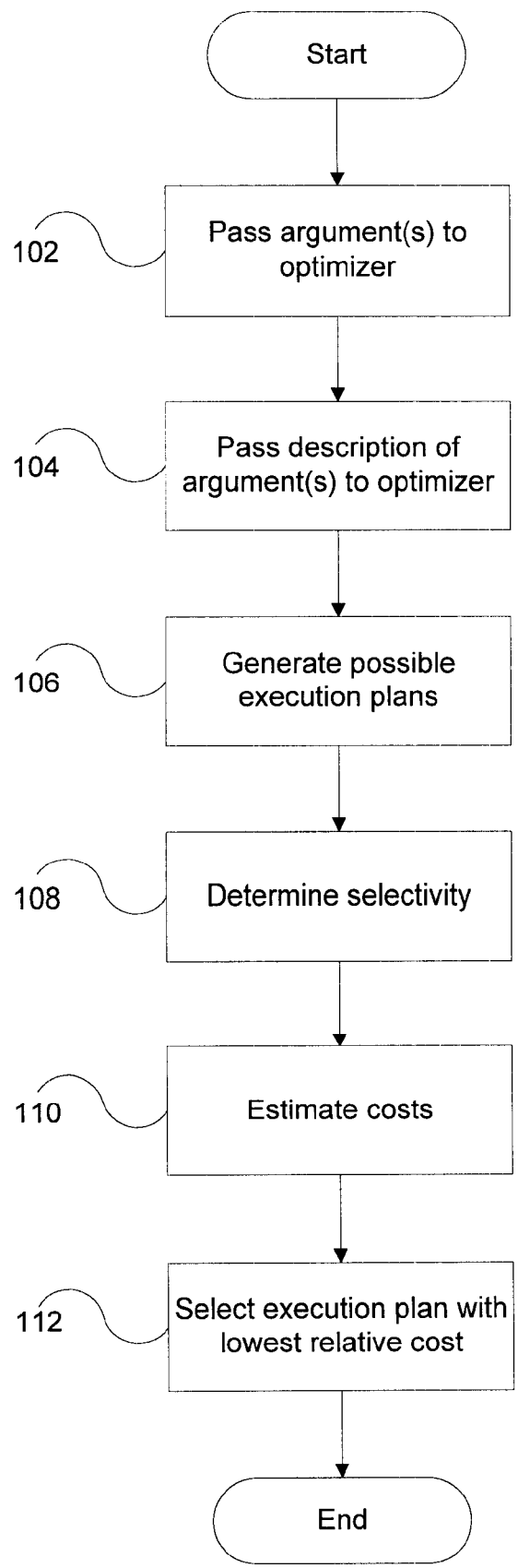
FIG. 1 is a process flow showing process actions for an embodiment of the invention.

FIG. 1 depicts a process flow for an embodiment of the invention. According to this embodiment of the invention, at least two categories of information regarding variables or arguments in a database statement can be passed to an optimizer. First, the list of arguments can be passed to the optimizer (102). This includes the value of variables and literals that are present in the database statement.

A second category of information passed to the optimizer involves a description of the arguments in the database statement (104). For example, the argument type for each argument in the database statement can be passed to the optimizer. The following are examples of such argument types:

literals
bind variables
columns
type attributes
NULL
none of the above

This is not intended to be an exhaustive list of possible descriptions that can be passed to the optimizer. Other descriptions regarding the characteristics, structure, or type of the argument can be used within the scope of the invention. The description of the arguments can be used in the present invention to more effectively estimate selectivity and cost, particularly for database statements containing variables whose values are unknown at compile-time.

Based upon available access paths, the optimizer then generates one or more possible execution plans (106). Each execution plan is directed to an alternate combination or order of steps to accomplish the results sought by the database statement. Depending upon the type of execution plans generated by the optimizer, the selectivity of the predicate in the database statement may be computed (108). For example, if the only possible execution plan is a full table scan, then a selectivity value need not be determined. However, it may be desirable to determine a selectivity value if one or more possible execution plans involve other access paths, e.g., by accessing an index.

The optimizer then estimates the cost for each execution plan (110). The estimated costs may be generated by use of the previously calculated selectivity value. The optimizer then selects for execution the execution plan having the lowest relative cost (112).

As an example, consider the following database statement:

SELECT *
FROM Table1, Table2
WHERE equals(Table1.col, Table2.col.age)=TRUE

This database statement joins the tables "Table1" and "Table2" such that the value of the column "Table1.col" equals the value of the column "Table2.col.age". The column "Table2.col" is of type "person" which can be created using the following statement:

CREATE TYPE person
(
age INT CONSTRAINT check values (1,100)
)

Consistent with the invention, the arguments to the "equals()" function are passed to the optimizer (i.e., the "Table1.col" and "Table2.col.age" arguments). The present invention further passes a description of the arguments to the optimizer. For example, the argument type of the arguments can be passed to the optimizer. The argument type of the "Table2.col.age" argument is "type attribute" and the argument type of the "Table1.col" argument is "column".

The fact that an argument is a "type attribute" provides information that can be used by an optimizer to more accurately determine selectivity. If a type attribute is present in a predicate, then some characteristics of the type attribute can be used to determine the selectivity of the predicate. In the present example, "age" is an attribute of type "person" with a constraint that limits its value to the range of 1 to 100. This constraint information can be matched against the actual range of values for a column to determine the selectivity of the predicate.

For instance, assume that Table1 and Table2 each have 10,000 rows. Furthermore, assume that statistics have been collected for the Table1.col column, in which the values for this column range from 1 to 200 and the values in the column are uniformly distributed over this range. Also, assume that the values in the Table2.col.age attribute are uniformly distributed. Since the optimizer knows that a type attribute is in the database statement, and the optimizer further knows that the specific type attribute being referenced has a range constraint, that range constraint can be matched against the range of values in the column to determine selectivity.

The selectivity value is determined by calculating the percentage of rows in the Cartesian product of Table1 and Table2 that satisfy the predicate. Since the Table1.col column is uniformly distributed over the range from 1 to 200, there are 50 rows for each value in the range. However, since the type attribute Table2.col.age is constrained from 1 to 100, only half the rows in Table1, i.e., 5000 rows, can join with Table2. Similarly, there are 100 rows in Table2 for each value of the "age" attribute in the range from 1 to 100. Thus, each row of Table1 that can join with Table2 joins with 100 rows in Table2. The selectivity value for the predicate in the example query can be calculated as follows:

Selectivity=((5000*100)/(10,000*10,000))*100%=0.5% (or 0.005)

Note that argument descriptions need not be passed for all arguments within a given predicate. It is particularly useful to pass an argument description for a variable for which a corresponding value is not known at compile time. However, in some circumstances, the benefit of passing an argument description for an argument may not exceed the potential costs. For example, if an argument of type "literal" is present in a predicate, passing an argument description for this argument may not necessarily produce a more accurate selectivity determination. Thus, it may not be necessary in all cases to pass an argument description for this type of argument.

As another example, consider the following database statement:

SELECT *
FROM Table2
WHERE equals(Table2.col, :x)=TRUE

This database statement queries for all entries from table emp_table where the value of column "Table2.col" equals the bind variable :x. The arguments to the "equal()" function are passed to the optimizer (i.e., the "Table2.col" and ":x" arguments). Since :x is a bind variable whose value is unknown at compile-time, the present invention further passes a description of the arguments to the optimizer. For example, the argument type of the arguments can be passed to the optimizer. The argument type of the Table2.col argument is "column" and the argument type of the :x argument is "bind variable".

Information or characteristics regarding the bind variable can be used to compute a selectivity value for the predicate of the database statement. Similar to the attribute type example above, the bind variable could have been created or declared to have a range constraint upon its values. Since the description of the argument passed to the optimizer identifies "bind variable" as the type of an argument, and the optimizer further knows that the specific bind variable being referenced has a range constraint, that range constraint can be matched against the range of values in the column to determine selectivity. The selectivity value is determined by calculating the percentage of rows in the Table2.col column that satisfy the predicate. Thus, instead of a possible arbitrary range for the bind variable, the optimizer has information that can be used to accurately determine the selectivity of the predicate.

For example, if the collected statistics for the Table2.col column indicates that the range of values for the column extends from 1 to 100 in a uniform fashion, and the value of the bind variable is constrained within any range that falls from 1 to 100 (e.g., range 2–30 or range 50–100), then the selectivity of the predicate "equals(Table2.col, :x)=TRUE" is 1.0% or 0.01. This selectivity value can thereafter be used to estimate the cost of possible execution plans.

The present invention can be applied to optimizers that operate upon both "native" and "non-native" objects in the database system. Typical database systems have built-in support for certain native or system-supplied objects, such as built-in data types, functions, and access methods. For example, "CHAR" is a common built-in data type that is used to store character strings. B+Trees and Hash Indexes are two examples of built-in access methods that can be found in conventional database systems. In recent years, databases are being used to store different types of data, such as spatial, image, video, and audio data. Often, these data types are not native to the database system; it is unrealistic to attempt to provide native support for all possible data types since it is impossible to foresee all possible types of complex data that may be created for storage in the database. Therefore, some database systems can be configured to allow non-native or user-defined data types to be defined for the database. For many of these non-native data types, system-supplied access methods and functions cannot be applied to operate upon them, since the structure and characteristics of these data types are not known or supported by the system-supplied access methods and functions. To provide efficient data operations upon these data types, nonnative or user-defined access methods and functions can also be defined to extend the operation of the database system.

Because the structure, operation, and characteristics of built-in objects are known to the database system and to the designers of the system-supplied database optimizer, traditional optimizers can generate cost estimates for execution plans involving such native objects or access methods. These cost estimates can be used to choose an optimal execution plan for a SQL statement involving built-in objects.

Unfortunately, traditional optimizers encounter significant problems attempting to generate an optimal execution plan if the SQL statement involves non-native objects, such as user-defined data types, user-defined functions, and user-defined access methods. This results because the system-supplied cost, selectivity, and statistics functions are not specifically configured to recognize or work with non-system-supplied entities, operations, and access methods. If the optimizer cannot accurately estimate the cost of an execution plan involving non-native objects, then relatively inefficient or slow execution plans may be mistakenly chosen by the optimizer.

One approach that can be used to address this problem is to associate objects with non-native optimizer-related properties or operations. According to this approach, non-native cost, statistics, selectivity functions are considered object properties that can be associated with various objects on the system, such as for example, user-defined functions, indexes, indextypes, packages, and columns. If the optimizer encounters an execution plan involving an object which is associated with a non-native optimizer-related function, that function is called to estimate the cost of that execution plan. Further details regarding optimizers and optimizer-related functions (including optimizers directed to non-native objects) are disclosed in co-pending and pending U.S. application Ser. No 09/272,691, titled "METHOD AND MECHANISM FOR EXTENDING NATIVE OPTIMIZATION IN A DATABASE SYSTEM", filed Mar. 18, 1999, and co-pending and pending U.S. application Ser. No. 09/275,896, titled "METHOD AND MECHANISM FOR ASSOCIATING PROPERTIES WITH OBJECTS AND INSTANCES" filed Mar. 18, 1999, both of which are hereby incorporated by reference in their entirety.

The optimizer-related functions can be defined as methods of an "optimizer object type" that is associated with one or more objects on the system. Thus, the optimizer object type can be considered an object property to be registered to an object. The responsibility for building and maintaining the optimizer object type is given to the domain expert familiar with the object for which costs, selectivity, or statistics are to be determined. The methods are developed with reference to the specific structure and characteristics of the objects with which they are associated.

According to an embodiment of the present invention, the optimizer object type is created to receive both the argument list and a description of the arguments for a predicate in a database statement. When a SQL statement is processed involving an object for which a non-native selectivity function has been registered, the registered selectivity function can be called by the optimizer to determine the estimated selectivity of a predicate involving that object, and thus the cost of an execution plan involving that object. The relative costs of alternate execution plans can thereafter be compared to select the appropriate execution plan for execution.

According to an alternative embodiment of the invention, a description of the arguments is not explicitly passed to the optimizer. Instead, the description information is derived from the argument information that appears in the database statement. Recall the prior database statement example:

SELECT *
FROM Table2
WHERE equals(Table2.col, :x)=TRUE

The arguments to the "equals()" function are passed to the optimizer (i.e., the "Table2.col" and ":x" arguments). Instead of explicitly passing the argument types of the arguments to the optimizer, the argument types are derived from the information that appears in the database statement. Thus, the argument type of the "Table2.col" argument can be determined to be a "column" type based upon declarative information for the Table2 object. The argument type of the ":x" argument can be determined to be a bind variable based upon the syntax of this argument. The derived argument type information can be used to determine the selectivity of the predicate using the procedure described above.

The present invention can be used to determine selectivity of predicates, even if the description of the arguments does not provide information that can be used to more accurately compute a selectivity value. According to this aspect of the invention, the characteristics of the function or operator within the predicate of the database statement is used to determine the selectivity of the database statement. For example, consider the following database statement:

SELECT *
FROM Table3
WHERE Table3.col=arctan(:x)

This database statement queries for all entries from Table3 in which the values of the column Table3.col equal arctan (:x).

Assume that there is no range limitation upon the bind variable ":x". For purposes of this example, the mere fact that :x is a bind variable does not provide further information that is useful for more accurately determining a selectivity value. However, the characteristics of the function "arctan ()" does provide useful information that can be used. Specifically, it is known that the output of the arctan() function always produces a value between 0 and 360. Thus, the function or operator itself may have a range constraint (or other useful information) that can be used to calculate selectivity. The range constraint of the function arctan() is matched against the collected statistics for the Table3.col column to determine the selectivity of the above predicate. If it is assumed that the Table3.col column contains a uniform range of values that span from 0 to 360, then the selectivity of this predicate is 1/360.

Hardware Overview

Figure 2:
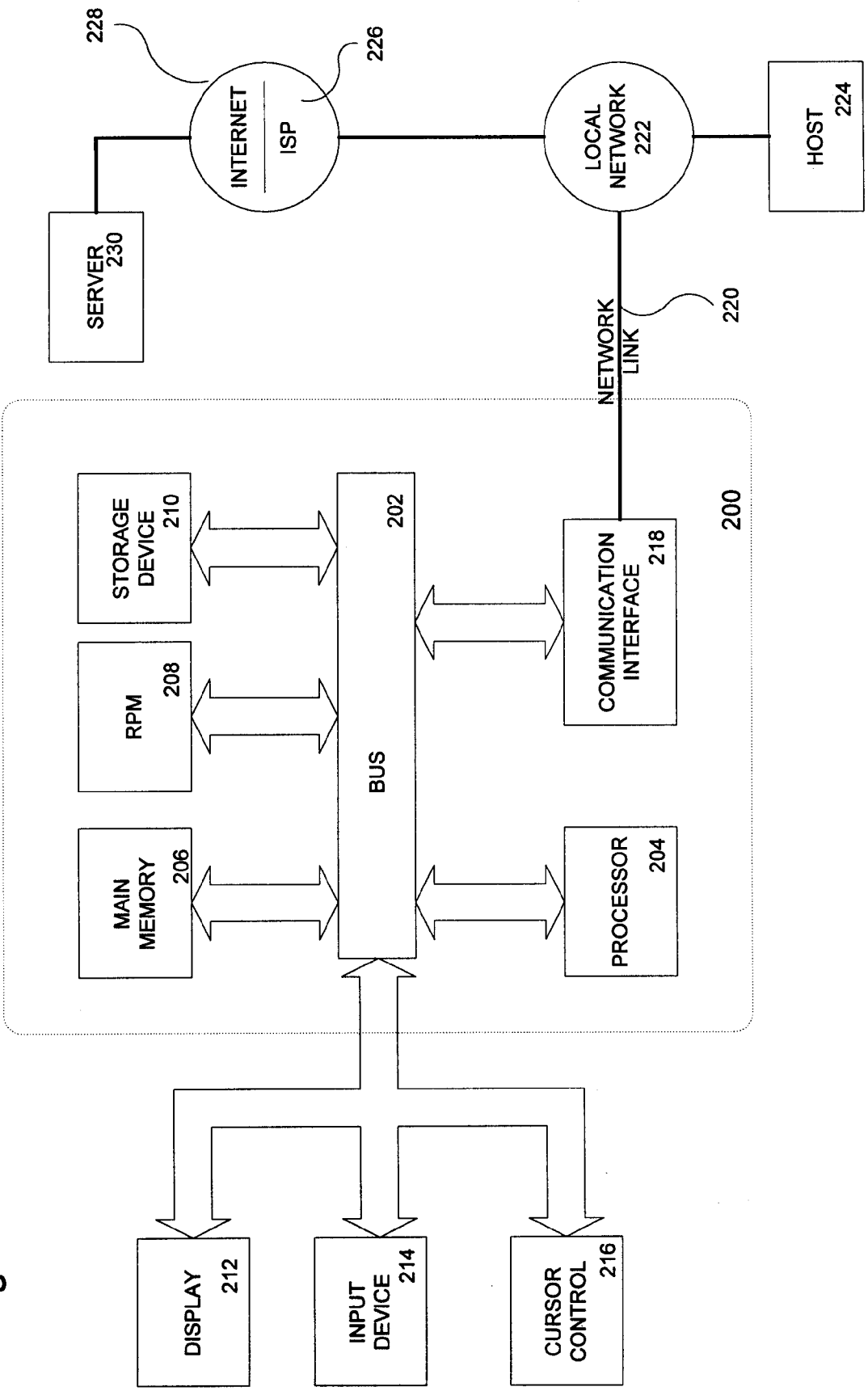
FIG. 2 is a diagram of a computer hardware system with which the present invention can be implemented.

FIG. 2 is a block diagram that illustrates a computer system 200 upon which an embodiment of the invention may be implemented. Computer system 200 includes a bus 202 or other communication mechanism for communicating information, and a processor 204 coupled with bus 202 for processing information. Computer system 200 also includes a main memory 206, such as a random access memory (RAM) or other dynamic storage device, coupled to bus 202 for storing information and instructions to be executed by processor 204. Main memory 206 also may be used for storing temporary variables or other intermediate information during execution of instructions to be executed by processor 204. Computer system 200 further includes a read only memory (ROM) 208 or other static storage device coupled to bus 202 for storing static information and instructions for processor 204. A storage device 210, such as a magnetic disk or optical disk, is provided and coupled to bus 202 for storing information and instructions.

Computer system 200 may be coupled via bus 202 to a display 212, such as a cathode ray tube (CRT), for displaying information to a computer user. An input device 214, including alphanumeric and other keys, is coupled to bus 202 for communicating information and command selections to processor 204. Another type of user input device is cursor control 216, such as a mouse, a trackball, or cursor direction keys for communicating direction information and command selections to processor 204 and for controlling cursor movement on display 212. This input device typically has two degrees of freedom in two axes, a first axis (e.g., x) and a second axis (e.g., y), that allows the device to specify positions in a plane.

The invention is related to the use of computer system 200 for optimization in a database system. According to one embodiment of the invention, such use is provided by computer system 200 in response to processor 204 executing one or more sequences of one or more instructions contained in main memory 206. Such instructions may be read into main memory 206 from another computer-readable medium, such as storage device 210. Execution of the sequences of instructions contained in main memory 206 causes processor 204 to perform the process steps described herein. One or more processors in a multiprocessing arrangement may also be employed to execute the sequences of instructions contained in main memory 206. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 204 for execution. Such a medium may take many forms, including but not limited to, non-volatile media, volatile media, and transmission media. Non-volatile media includes, for example, optical or magnetic disks, such as storage device 210. Volatile media includes dynamic memory, such as main memory 206. Transmission media includes coaxial cables, copper wire and fiber optics, including the wires that comprise bus 202. Transmission media can also take the form of acoustic or light waves, such as those generated during radio wave and infrared data communications.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 204 for execution. For example, the instructions may initially be carried on a magnetic disk of a remote computer. The remote computer can load the instructions into its dynamic memory and send the instructions over a telephone line using a modem. A modem local to computer system 200 can receive the data on the telephone line and use an infrared transmitter to convert the data to an infrared signal. An infrared detector coupled to bus 202 can receive the data carried in the infrared signal and place the data on bus 202. Bus 202 carries the data to main memory 206, from which processor 204 retrieves and executes the instructions. The instructions received by main memory 206 may optionally be stored on storage device 210 either before or after execution by processor 204.

Computer system 200 also includes a communication interface 218 coupled to bus 202. Communication interface 218 provides a two-way data communication coupling to a network link 220 that is connected to a local network 222. For example, communication interface 218 may be an integrated services digital network (ISDN) card or a modem to provide a data communication connection to a corresponding type of telephone line. As another example, communication interface 218 may be a local area network (LAN) card to provide a data communication connection to a compatible LAN. Wireless links may also be implemented. In any such implementation, communication interface 218 sends and receives electrical, electromagnetic or optical signals that carry digital data streams representing various types of information.

Network link 220 typically provides data communication through one or more networks to other data devices. For example, network link 220 may provide a connection through local network 222 to a host computer 224 or to data equipment operated by an Internet Service Provider (ISP) 226. ISP 226 in turn provides data communication services through the world wide packet data communication network now commonly referred to as the "Internet" 228. Local network 222 and Internet 228 both use electrical, electromagnetic or optical signals that carry digital data streams. The signals through the various networks and the signals on network link 220 and through communication interface 218, which carry the digital data to and from computer system 200, are exemplary forms of carrier waves transporting the information.

Computer system 200 can send messages and receive data, including program code, through the network(s), network link 220 and communication interface 218. In the Internet example, a server 230 might transmit a requested code for an application program through Internet 228, ISP 226, local network 222 and communication interface 218. In accordance with the invention, one such downloaded application provides for optimization in a database system.

The received code may be executed by processor 204 as it is received, and/or stored in storage device 210, or other non-volatile storage for later execution. In this manner, computer system 200 may obtain application code in the form of a carrier wave.

In the foregoing specification, the invention has been described with reference to specific embodiments thereof. It will, however, be evident that various modifications and changes may be made thereto without departing from the broader spirit and scope of the invention. For example, the reader is to understand that the specific ordering and combination of process actions shown in the process flow diagrams described herein is merely illustrative, and that the invention can be performed using different or additional process action, or a different combination or ordering of process actions. The specification and drawings are, accordingly, to be regarded in an illustrative rather than restrictive sense.

What is claimed is:

1. A method of generating an execution plan for a database statement, the database statement containing a predicate having an argument whose value is not known at time of generating the execution plan, the method comprising:
    determining an argument description for the argument;
    utilizing the argument description to determine characteristics of the argument;
    calculating a selectivity value for the predicate based upon the characteristics of the argument;
    estimating a cost for one or more possible execution plans based upon the selectivity value; and
    selecting the execution plan having a lowest relative cost;
wherein the argument description comprises an argument type for the argument, the argument type is bind variable, and the characteristics comprise range information for the bind variable.

2. The method of claim 1 in which calculating the selectivity value comprises matching the range information for the bind variable against collected statistics.

3. A method of generating an execution plan for a database statement, the database statement containing a predicate having an argument whose value is not known at time of generating the execution plan, the method comprising:
    determining an argument description for the argument;
    utilizing the argument description to determine characteristics of the argument;
    calculating a selectivity value for the predicate based upon the characteristics of the argument;
    estimating a cost for one or more possible execution plans based upon the selectivity value; and
    selecting the execution plan having a lowest relative cost;
wherein the argument description comprises an argument type for the argument and wherein the argument type is a type attribute.

4. The method of claim 3 in the characteristics comprise range information for the type attribute.

5. The method of claim 4 in which calculating the selectivity value comprises matching the range information for the type attribute against collected statistics.

6. A method of generating an execution plan for a database statement, the database statement containing a predicate having an argument whose value is not known at time of generating the execution plan, the method comprising:

determining an argument description for the argument;

utilizing the argument description to determine characteristics of the argument;

calculating a selectivity value for the predicate based upon the characteristics of the argument;

estimating a cost for one or more possible execution plans based upon the selectivity value; and selecting the execution plan having a lowest relative cost; wherein the argument description is passed to an optimizer.

7. A method of generating an execution plan for a database statement, the database statement containing a predicate having an argument whose value is not known at time of generating the execution plan, the method comprising:

determining an argument description for the argument;

utilizing the argument description to determine characteristics of the argument;

calculating a selectivity value for the predicate based upon the characteristics of the argument;

estimating a cost for one or more possible execution plans based upon the selectivity value; and selecting the execution plan having a lowest relative cost; wherein the argument description is derived from the database statement.

8. A method of generating an execution plan for a database statement, the database statement containing a predicate having an argument whose value is not known at time of generating the execution plan, the method comprising:

determining an argument description for the argument;

utilizing the argument description to determine characteristics of the argument;

calculating a selectivity value for the predicate based upon the characteristics of the argument;

estimating a cost for one or more possible execution plans based upon the selectivity value; and selecting the execution plan having a lowest relative cost; wherein determining the selectivity value is performed by a non-native selectivity function.

9. A method of generating an execution plan for a database statement, the database statement containing a predicate having an argument whose value is not known at time of generating the execution plan, the method comprising:

determining an argument description for the argument;

utilizing the argument description to determine characteristics of the argument;

calculating a selectivity value for the predicate based upon the characteristics of the argument;

estimating a cost for one or more possible execution plans based upon the selectivity value; and selecting the execution plan having a lowest relative cost; wherein the value of the at least one argument is not known at compile time.

10. A method for optimizing an execution of a database statement, comprising:

passing an argument list to an optimizer, said argument list comprising one or more arguments that are present in a predicate;

determining an argument description for a selected one of said one or more arguments;

determining characteristics of said selected one of said one or more arguments based upon said argument description;

calculating a selectivity value for said predicate based upon said characteristics; and estimating a cost for one or more possible execution plans based upon said selectivity value;

selecting an execution plan having a lowest relative cost; wherein said argument description comprises an argument type for said selected one of said one or more arguments and said argument type is selected from the group consisting of bind variable and type attribute.

11. The method of claim 10 in which said characteristics comprise range information for said selected one of said one or more arguments.

12. The method of claim 11 in which calculating said selectivity value comprises matching said range information against collected statistics.

13. A method for optimizing an execution of a database statement, comprising:

passing an argument list to an optimizer, said argument list comprising one or more arguments that are present in a predicate;

determining an argument description for a selected one of said one or more arguments;

determining characteristics of said selected one of said one or more arguments based upon said argument description;

calculating a selectivity value for said predicate based upon said characteristics; and estimating a cost for one or more possible execution plans based upon said selectivity value;

wherein said argument description is explicitly passed to an optimizer.

14. A method for optimizing an execution of a database statement, comprising:

passing an argument list to an optimizer, said argument list comprising one or more arguments that are present in a predicate;

determining an argument description for a selected one of said one or more arguments;

determining characteristics of said selected one of said one or more arguments based upon said argument description;

calculating a selectivity value for said predicate based upon said characteristics; and estimating a cost for one or more possible execution plans based upon said selectivity value;

wherein said argument description is derived from said database statement.

15. A method for optimizing an execution of a database statement, comprising:

passing an argument list to an optimizer, said argument list comprising one or more arguments that are present in a predicate;

determining an argument description for a selected one of said one or more arguments;

determining characteristics of said selected one of said one or more arguments based upon said argument description;

calculating a selectivity value for said predicate based upon said characteristics; and estimating a cost for one or more possible execution plans based upon said selectivity value;

wherein determining said selectivity value is performed by a non-native selectivity function.

16. A method for optimizing an execution of a database statement, comprising:

passing an argument list to an optimizer, said argument list comprising one or more arguments that are present in a predicate;

determining an argument description for a selected one of said one or more arguments;

determining characteristics of said selected one of said one or more arguments based upon said argument description;

calculating a selectivity value for said predicate based upon said characteristics; and estimating a cost for one or more possible execution plans based upon said selectivity value;

wherein a value of said selected one of said one or more arguments is not known at compile time.

17. A method for optimizing an execution of a database statement, comprising:

passing an argument list to an optimizer, said argument list comprising one or more arguments that are present in a predicate;

determining an argument description for a selected one of said one or more arguments;

determining characteristics of said selected one of said one or more arguments based upon said argument description;

calculating a selectivity value for said predicate based upon said characteristics; and estimating a cost for one or more possible execution plans based upon said selectivity value;

wherein argument descriptions are determined for a plurality of said one or more arguments.

18. A computer program product that includes a medium readable by a processor, said medium having stored thereon a sequence of instructions which, when executed by said processor, causes said processor to execute a process for optimizing an execution of a database statement, said process comprising:

passing an argument list to an optimizer, said argument list comprising one or more arguments that are present in a predicate;

determining an argument description for selected ones of said one or more arguments;

determining characteristics of said selected ones of said one or more arguments based upon said argument description;

calculating a selectivity value for said predicate based upon said characteristics; and estimating a cost for one or more possible execution plans based upon said selectivity value.

19. The computer program product of claim 18 further comprising:

selecting an execution plan having a lowest relative cost.

20. The computer program product of claim 18 in which said argument description comprises an argument type for said selected one of said one or more arguments.

21. The computer program product of claim 20 in which said argument type is selected from the group consisting of bind variable and type attribute.

22. The computer program product of claim 21 in which said characteristics comprise range information for said selected one of said one or more arguments.

23. The computer program product of claim 21 in which calculating said selectivity value comprises matching said range information against collected statistics.

24. The computer program product of claim 18 in which said argument description is explicitly passed to an optimizer.

25. The computer program product of claim 18 in which said argument description is derived from said database statement.

26. The computer program product of claim 18 in which determining said selectivity value is performed by a non-native selectivity function.

27. The computer program product of claim 18 in which a value of said selected one of said one or more arguments is not known at compile time.

28. The computer program product of claim 18 in which argument descriptions are determined for a plurality of said one or more arguments.

29. The computer program product of claim 18 in which the selectivity value is calculated using statistics collected on one or more possible values for an argument.

30. The computer program product of claim 29 in which the argument is associated with data stored in the database, and the statistics describe a distribution of values of the data stored in the database.

31. The computer program product of claim 18 in which the argument description is derived from argument information present in the database statement.

32. The computer program product of claim 18 in which the selectivity value is calculated using characteristics of an element of the predicate.

33. The computer program product of claim 32 in which the element of the predicate is an operator.

34. The computer program product of claim 32 in which the element of the predicate is a function.

* * * * *

UNITED STATES PATENT AND TRADEMARK OFFICE
CERTIFICATE OF CORRECTION

PATENT NO. : 6,351,742 B1
DATED : February 26, 2002
INVENTOR(S) : Nipun Agarwal, Dinesh Das and Jagannathan Srinivasan It is certified that error appears in the above-identified patent and that said Letters Patent is hereby corrected as shown below:

<u>Column 14,</u>
Line 17, change dependency from "claim 21" to -- claim 22 --

Signed and Sealed this

Twenty-fourth Day of September, 2002

*Attest:*

*Attesting Officer*

JAMES E. ROGAN
*Director of the United States Patent and Trademark Office*